United States Patent
Salavati-Niasari et al.

(10) Patent No.: US 8,993,057 B2
(45) Date of Patent: Mar. 31, 2015

(54) METHOD FOR PREPARING SILICA-DYSPROSIUM OXIDE CORE-SHELL NANOPARTICLES

(76) Inventors: Masoud Salavati-Niasari, Kashan (IR); Fatemeh Davar, Kashan (IR); Morteza Enhessari, Naragh (IR); Mohammad Javad Esfahani, Naragh (IR)

(*) Notice: Subject to any disclaimer, the term of this patent is extended or adjusted under 35 U.S.C. 154(b) by 609 days.

(21) Appl. No.: 13/279,273

(22) Filed: Oct. 22, 2011

(65) Prior Publication Data
US 2012/0034465 A1    Feb. 9, 2012

(51) Int. Cl.
| | |
|---|---|
| C04B 41/85 | (2006.01) |
| C04B 35/14 | (2006.01) |
| C23C 16/22 | (2006.01) |
| C23C 16/42 | (2006.01) |
| C09K 3/00 | (2006.01) |
| B32B 9/04 | (2006.01) |
| B82Y 30/00 | (2011.01) |
| B82B 3/00 | (2006.01) |
| C09K 11/77 | (2006.01) |
| B01J 13/02 | (2006.01) |
| B82Y 40/00 | (2011.01) |
| C01B 33/18 | (2006.01) |
| C09K 11/02 | (2006.01) |

(52) U.S. Cl.
CPC .............. C09K 11/7701 (2013.01); B01J 13/02 (2013.01); B82Y 30/00 (2013.01); B82Y 40/00 (2013.01); C01B 33/18 (2013.01); C09K 11/02 (2013.01); C01P 2004/64 (2013.01); C01P 2004/84 (2013.01); Y10S 977/773 (2013.01); Y10S 977/896 (2013.01)
USPC ...... 427/255.19; 427/215; 427/343; 428/404; 252/182.32; 977/773; 977/896

(58) Field of Classification Search
USPC .................................................. 977/773, 896
See application file for complete search history.

(56) References Cited

U.S. PATENT DOCUMENTS

| | | | |
|---|---|---|---|
| 8,128,908 B2* | 3/2012 | Santra et al. .................... 424/9.6 |
| 8,361,437 B2* | 1/2013 | Sharma et al. ................ 424/1.29 |
| 2006/0248663 A1* | 11/2006 | Tremblay et al. .................. 8/405 |
| 2007/0269382 A1* | 11/2007 | Santra et al. ............... 424/9.323 |
| 2008/0081865 A1* | 4/2008 | Biswas et al. .................. 524/445 |
| 2008/0167414 A1* | 7/2008 | Biswas et al. .................. 524/437 |
| 2010/0254911 A1* | 10/2010 | Sharma et al. ............... 424/9.32 |
| 2011/0101263 A1* | 5/2011 | Tokumitsu et al. ......... 252/62.55 |
| 2011/0105889 A1* | 5/2011 | Tsukada et al. ............... 600/411 |
| 2012/0034465 A1* | 2/2012 | Salavati-Niasari et al. ... 428/404 |

* cited by examiner

Primary Examiner — Joseph D Anthony

(57) ABSTRACT

Silica-dysprosium oxide core-shell nanoparticles and a method for preparing the silica-dysprosium oxide core-shell nanoparticles are disclosed. Initially, ethyl silicate, n-butanol, ethylenediamine, and distilled water are mixed in the presence of ultrasonic radiation to prepare silica nanoparticles. Then, the silica nanoparticles are isolated. Next, the isolated silica nanoparticles, an acid, n-butanol, and dysprosium oxide are mixed in the presence of ultrasonic radiation to prepare silica-dysprosium oxide core-shell nanoparticles. Finally, the silica-dysprosium oxide core-shell nanoparticles are isolated.

13 Claims, 3 Drawing Sheets

METHOD FOR PREPARING SILICA-DYSPROSIUM OXIDE CORE-SHELL NANOPARTICLES

SPONSORSHIP STATEMENT

This application has been financially sponsored for international filing by the Iranian Nanotechnology Initiative Council, the University of Kashan, and the Islamic Azad University, Naragh Branch, which do not have any rights in this application.

TECHNICAL FIELD

This application generally relates to core-shell nanoparticles, and more particularly relates to a method for preparing silica-dysprosium oxide core-shell nanoparticles.

BACKGROUND

Silica, i.e., silicon dioxide, nanoparticles can be used as, for example, catalysts, stabilizers, and pigments in a variety of industries. The quality of the silica nanoparticles depends on their size and size distribution. There are numerous methods for synthesizing silica nanoparticles to have a small size and narrow size distribution, such as flame spray pyrolysis, water-in-oil microemulsion, bead milling, continuous microwave hydrothermal synthesis, and self-assembly. For example, silica particles ranging from 5 nm to several microns in diameter have been synthesized.

Rare earth oxide nanoparticles are of interest because of their catalytic, electronic, magnetic, and optical properties. Rare earth oxide core-shell nanoparticles are of particular interest because they exhibit multiple functions that do not exist in single-component compounds. For example, both the core and the shell of some rare earth oxide core-shell nanoparticles have been found to be actively involved in catalytic processes. However, a new, more economical method is needed to prepare rare earth oxide core-shell nanoparticles, such as silica-dysprosium oxide core-shell nanoparticles.

SUMMARY

Silica-dysprosium oxide core-shell nanoparticles and a method for preparing the silica-dysprosium oxide core-shell nanoparticles are disclosed. Initially, ethyl silicate, n-butanol, ethylenediamine, and distilled water are mixed in the presence of ultrasonic radiation to prepare silica nanoparticles. Then, the silica nanoparticles are isolated. Next, the isolated silica nanoparticles, an acid, n-butanol, and dysprosium oxide are mixed in the presence of ultrasonic radiation to prepare silica-dysprosium oxide core-shell nanoparticles. Finally, the silica-dysprosium oxide core-shell nanoparticles are isolated.

In some implementations, the ratio of the volume of the n-butanol to the volume of the distilled water mixed to prepare the silica nanoparticles can be 5:1. The ratio of the volume of the ethyl silicate to the volume of the distilled water mixed to prepare the silica nanoparticles can be 1:10. The ratio of the volume of the ethylenediamine to the volume of the ethyl silicate mixed to prepare the silica nanoparticles can be 10:1. The ethylenediamine can have a concentration of 0.15 mol/L.

In some implementations, the ethyl silicate, the n-butanol, the ethylenediamine, and the distilled water can be mixed in the presence of the ultrasonic radiation to prepare the silica nanoparticles at 50° C. for a total of 60 minutes. The ultrasonic radiation can have a sonication power of 60 watts. In some implementations, the silica nanoparticles can be dried at 80° C. and calcined at 500° C. to isolate the silica nanoparticles. The silica-dysprosium oxide core-shell nanoparticles can be calcined at 500° C. to isolate the silica-dysprosium oxide core-shell nanoparticles.

In some implementations, the acid can be citric acid. The ratio of the weight of the silica nanoparticles in grams to the volume of solution including the acid, the n-butanol, and the dysprosium oxide mixed to prepare the silica-dysprosium oxide core-shell nanoparticles can be 3:500.

Details of one or more implementations and/or embodiments of the method for preparing silica-dysprosium oxide core-shell nanoparticles are set forth in the accompanying drawings and the description below. Other aspects that can be implemented will be apparent from the description and drawings, and from the claims.

BRIEF DESCRIPTION OF DRAWINGS

Like reference symbols indicate like elements throughout the specification and drawings.

DETAILED DESCRIPTION

A method for preparing silica-dysprosium oxide core-shell nanoparticles is disclosed. Initially, silica nanoparticles are synthesized by the base-catalyzed hydrolysis of ethyl silicate. Next, the silica nanoparticles are coated with a layer of dysprosium oxide to form the silica-dysprosium oxide core-shell nanoparticles. Various parameters of the method, such as the type of base and the ultrasonication time and power, have been optimized so that the silica-dysprosium oxide core-shell nanoparticles have an average size of about 14 nm and a narrow size distribution.

Figure 1:
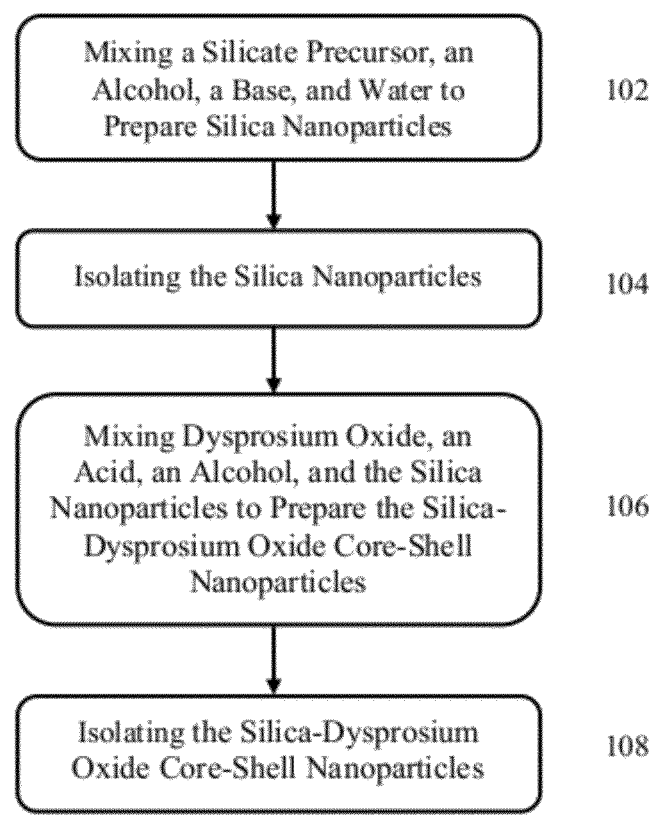
FIG. 1 illustrates an example of a method for preparing silica-dysprosium oxide core-shell nanoparticles.

Referring to FIG. 1, a method for preparing silica-dysprosium oxide core-shell nanoparticles is illustrated. Initially, a silicate precursor, an alcohol, a base, and water are mixed to prepare silica nanoparticles (step 102). The prepared silica nanoparticles are substantially monodispersed and have a narrow size distribution with an average diameter of about 10 nm. The silicate precursor can be, for example, ethyl silicate ("tetraethyl orthosilicate"; "TEOS"; $(C_2H_5)_4SiO_4$). The alcohol can be, for example, allyl alcohol ($C_3H_6O$), isobutanol ("isobutyl alcohol"; "IBA"; $C_4H_{10}O$), n-butanol ("1-butanol"; "n-butyl alcohol"; $C_4H_9OH$), and/or 1-hexanol ($CH_3(CH_2)_5OH$). The base can be, for example, ethylenediamine ("En"; $C_2H_4(NH_2)_2$), hydrazine ($N_2H_4$), triethylenetetramine ("TETA"; "trien"; $(CH_2NHCH_2CH_2NH_2)_2$), and/or trimethylenediamine ("1,3-diaminopropane"; "TMEDA"; "propandiamine"; $C_3H_{10}N_2$). The water can be distilled water ($H_2O$).

In some implementations, to prepare the silica nanoparticles, n-butanol and distilled water are first mixed in an ultrasonic bath. The ratio of the volume of n-butanol to the volume of water mixed to prepare the silica nanoparticles can range from 1:1 to 5:1 and, preferably, be 5:1. The n-butanol and water can be sonicated for 5 to 15 minutes and, preferably, 10 minutes. Next, ethyl silicate can be added to the n-butanol and water solution. The ratio of the volume of ethyl silicate to the volume of water can range from 1:5 to 1:15 and, preferably, be 1:10. The n-butanol, water, and ethyl silicate can be sonicated for 10 to 30 minutes and, preferably, 20 minutes. Next, ethylenediamine having a concentration of about 0.15 mol/L is added as a base and catalyst. The ratio of the volume of ethylenediamine to the volume of ethyl silicate can range from 5:1 to 20:1 and, preferably, be 10:1. The n-butanol, water, ethyl silicate, and ethylenediamine mixture can be sonicated for 10 minutes to one hour and, preferably, 30 minutes until a white turbid suspension is formed. The ultrasonic bath can be kept at 35° C. to 60° C. and, preferably, 50° C. to prepare the silica nanoparticles. The sonication power can be 50 watts to 70 watts and, preferably, 60 watts.

The silica nanoparticles are then isolated (step 104). The silica nanoparticles can be isolated by filtering, rinsing, drying, and/or calcining. In some implementations, for example, the silica nanoparticles in the white turbid suspension can initially be filtered and then repeatedly rinsed with a solution including water and ethanol. Next, the filtered and rinsed silica nanoparticles can be dried in a heated environment, such as, for example, a vacuum oven at a temperature of 50° C. to 100° C. and, preferably, 80° C. for one to 48 hours and, preferably, 24 hours. Next, the dried silica nanoparticles can be calcined at a temperature of 300° C. to 800° C. and, preferably, 500° C. for two or more hours to isolate the silica nanoparticles by substantially evaporating all of the solvent within the silica nanoparticles.

Next, dysprosium oxide, an acid, an alcohol, and the silica nanoparticles are mixed to prepare the silica-dysprosium oxide core-shell nanoparticles (step 106). In some implementations, the dysprosium oxide ("dysprosia"; $Dy_2O_3$) can be in powder form, the acid can be, for example, citric acid ($C_6H_8O_7$), and the alcohol can be, for example, n-butanol.

In some implementations, to prepare the silica-dysprosium oxide core-shell nanoparticles, dysprosium oxide powder is mixed with a solution of citric acid and n-butanol in an ultrasonic bath. The dysprosium oxide powder, citric acid, and n-butanol can be sonicated for 30 minutes to two hours and, preferably, one hour. Next, the prepared silica nanoparticles can be dispersed in the dysprosium oxide solution. The ratio of the weight of the silica nanoparticles in grams to the volume of dysprosium oxide solution in milliliters can range from 3:800 to 3:100 and, preferably, be 3:500. The silica nanoparticles can be sonicated at 75° C. to 100° C. and, preferably, 90° C. for 30 minutes to five hours and, preferably, two hours. As a result, the silica-dysprosium oxide core-shell nanoparticles will be dispersed in the solution.

Finally, the silica-dysprosium oxide core-shell nanoparticles are isolated (step 108). The silica-dysprosium oxide core-shell nanoparticles can be isolated by centrifuging, rinsing, drying, and/or calcining. In some implementations, for example, the dispersed silica-dysprosium oxide core-shell nanoparticles can initially be centrifuged and then repeatedly rinsed with a solution including water and ethanol. Next, the centrifuged and rinsed silica-dysprosium oxide core-shell nanoparticles can be dried in a heated environment, such as, for example, a vacuum oven at 50° C. to 100° C. and, preferably, 80° C. for one to 48 hours and, preferably, 2 hours. Finally, the dried silica-dysprosium oxide core-shell nanoparticles can be calcined at 300° C. to 1000° C. and, preferably, 500° C. for two or more hours to isolate the silica-dysprosium oxide core-shell nanoparticles.

Silica-Dysprosium Oxide Core-Shell Nanoparticles Preparation Example

In one example, 25 mL of 1-butanol and 10 mL of water are added to a reaction vessel having a diameter of 51 mm and sonicated for 10 minutes. Then, 1 mL of ethyl silicate is added to the reaction vessel and sonicated for 20 minutes. Next, 10 mL of ethylenediamine having a concentration of 0.15 mol/L is added to the reaction vessel and sonicated for 30 minutes until a white turbid suspension is formed. The above steps are all performed at a temperature of 50° C. and at a sonication power of 60 watts. The white precipitate is then filtered, repeatedly washed with water and ethanol, dried in a vacuum oven at 80° C. for 24 hours, and finally calcined at 500° C. for 2 hours to isolate the silica nanoparticles.

Next, dysprosium oxide powder is mixed with a solution of citric acid and 1-butanol in an ultrasonic bath for one hour. Fifty mL of the dysprosium oxide solution and 0.3 g of the prepared silica nanoparticles are sonicated at 90° C. for two hours to form a dispersion of silica-dysprosium oxide core-shell nanoparticles. The silica-dysprosium oxide core-shell nanoparticles are then centrifuged, repeatedly washed with water and ethanol, dried in a vacuum oven at 80° C. for two hours, and finally calcined at 500° C. for 2 hours to isolate the silica-dysprosium oxide core-shell nanoparticles.

Figure 2A:
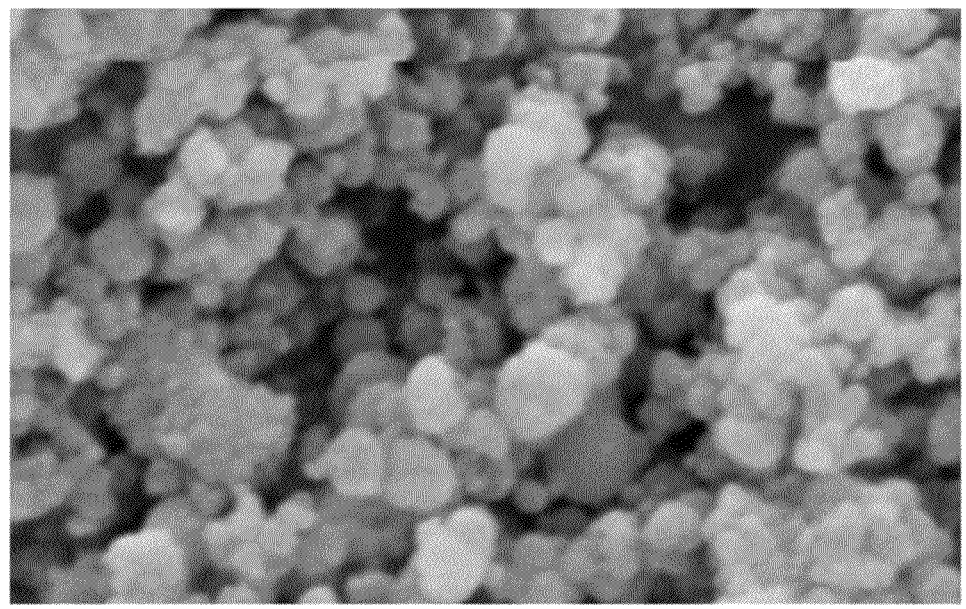
FIG. 2a illustrates a scanning electron micrograph of silica nanoparticles.
Figure 2B:
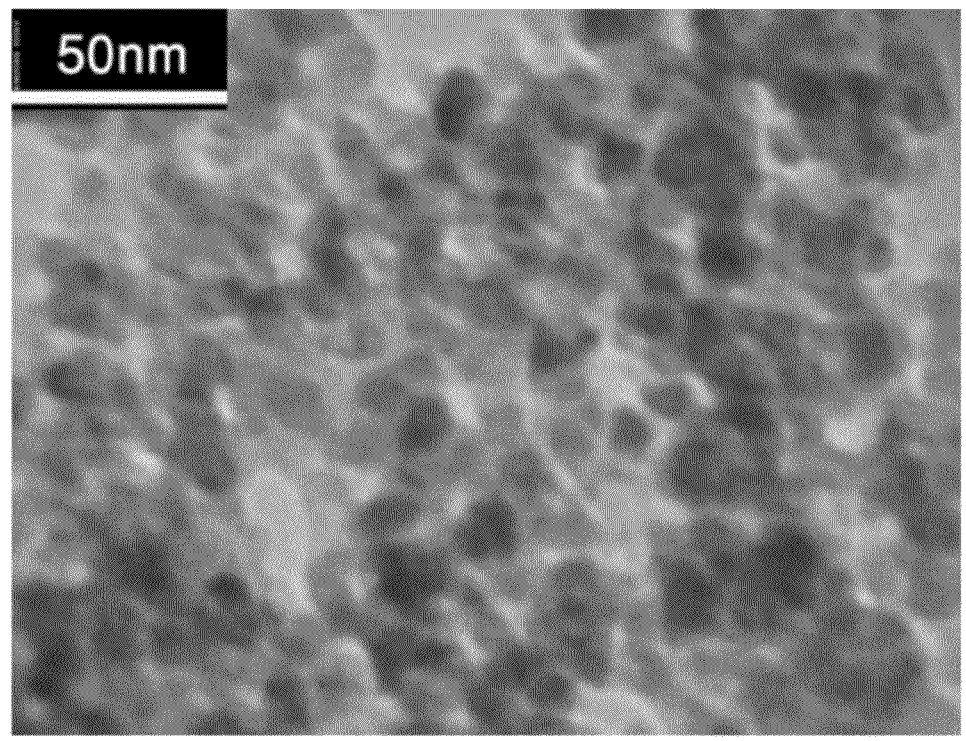
FIG. 2b illustrates a transmission electron micrograph of the silica nanoparticles.

The morphologies of the silica nanoparticles prepared according to the EXAMPLE above are illustrated by the scanning electron microscope ("SEM") micrograph of FIG. 2a taken at a magnification of 20,000 times and the transmission electron microscopic ("TEM") micrograph of FIG. 2b captured at an accelerating voltage of 100 kV. As illustrated in FIGS. 2a-b, the silica nanoparticles exhibit low aggregation and have an average agglomerated size of about 35 nm. The individual silica nanoparticles have an average diameter of about 10 nm.

Figure 3:
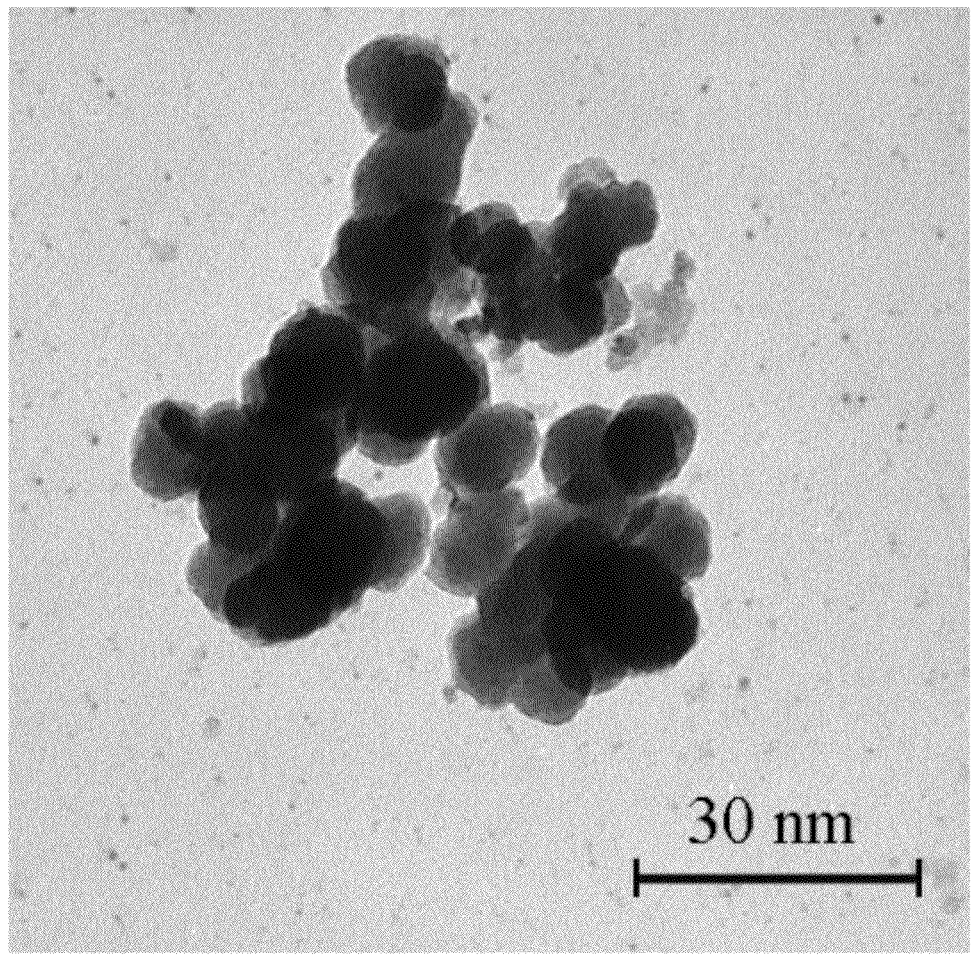
FIG. 3 illustrates a transmission electron micrograph of silica-dysprosium oxide core-shell nanoparticles.

The morphologies of the silica-dysprosium oxide core-shell nanoparticles prepared according to the EXAMPLE above are illustrated by the TEM micrograph of FIG. 3 captured at an accelerating voltage of 100 kV. As illustrated in FIG. 3, the silica-dysprosium oxide core-shell nanoparticles exhibit narrow size distribution and a clear core-shell structure. The silicon dioxide cores appear as black spheres with an average diameter of about 10 nm and the dysprosium oxide shells appear in gray with an average thickness of 2 nm, such that the silica-dysprosium oxide core-shell nanoparticles have an average diameter of about 14 nm.

In step 102, the silicate precursor, ethyl silicate, undergoes hydrolysis to produce soluble silica. Once the concentration of soluble silica reaches a critical value, self-nucleation occurs and the silica nanoparticles condense. The final particle size of the silica nanoparticles depends on several variables: (1) the alcohol, (2) the concentration of silicate precursor, (3) the base, (4) the reaction temperature, (5) the sonication duration, and (6) the sonication power. As such, to analyze the effects of the variables on the particle size, silica nanoparticles were prepared according to the EXAMPLE above with the difference that a single variable was changed to determine the change in particle size.

First, the type of the alcohol used has a significant effect on the size of the silica nanoparticles. Isobutanol, 1-hexanol, and allyl alcohol were each used in place of 1-butanol to prepare silica nanoparticles according to EXAMPLE. Allyl alcohol has the lowest molecular weight and the highest dielectric constant and, according to prior theories, is expected to result in the smallest particle size. Nevertheless, whereas the silica nanoparticles of the EXAMPLE above exhibited low aggregation and an average size of about 35 nm, the silica nanoparticles prepared with isobutanol were agglomerated and had an average size of about 40 nm. The silica nanoparticles prepared with 1-hexanol had an average size of about 375 nm and the silica nanoparticles prepared with allyl alcohol had an average size of about 1,500 nm. As such, unexpectedly and following extensive experimentation, using the alcohol 1-butanol was found to result in synthesis of the smallest silica nanoparticles.

Second, the concentration of silicate precursor, ethyl silicate, has a significant effect on the size of the silica nanoparticles. In the EXAMPLE above, the ratio of the ethyl silicate-to-water was 10:1, resulting in silica nanoparticles exhibiting low aggregation and an average size of about 35 nm. At an ethyl silicate-to-water ratio of 15:1, the silica nanoparticles had an average size of about 100 nm and at an ethyl silicate-to-water ratio of 20:1, the silica nanoparticles were highly agglomerated had an average size of about 1,500 nm. As such, following extensive experimentation, an ethyl silicate-to-water ratio of 10:1 was found to result in synthesis of the smallest silica nanoparticles.

Third, the type of the base used has a significant effect on the size of the silica nanoparticles. Hydrazine, trimethylenediamine, and triethylenetetramine were each used in place of ethylenediamine to prepare silica nanoparticles according to EXAMPLE above. Nevertheless, whereas the silica nanoparticles of the EXAMPLE above exhibited low aggregation and an average size of about 35 nm, the silica nanoparticles prepared with hydrazine had an average size of about 1,400 nm. The silica nanoparticles prepared with trimethylenediamine were highly agglomerated and had an average size of about 50 nm and the silica nanoparticles prepared with triethylenetetramine were highly agglomerated and had an average size of about 20 nm. Nevertheless, although the silica nanoparticles prepared with triethylenetetramine had the smallest particle size, their relatively high agglomeration renders them ineffective for coating. As such, silica nanoparticles prepared using ethylenediamine were used to synthesize silica-dysprosium oxide core-shell nanoparticles because of their small particle size and low aggregation.

Fourth, the reaction temperature has a significant effect on the size of the silica nanoparticles. The silica nanoparticles prepared at 50° C. according to the EXAMPLE above had an average size of about 35 nm. Silica nanoparticles prepared at a temperature of 30° C. had an average size of about 900 nm and silica nanoparticles prepared at a temperature of 40° C. had an average size of about 850 nm. As such, following extensive experimentation, silica nanoparticles prepared at 50° C. had a significantly smaller average size due to the acceleration of silica nucleation at the higher temperature.

Fifth, the sonication time has a significant effect on the size of the silica nanoparticles. Silica nanoparticles prepared with a total sonication time of 15 minutes exhibited a broad size distribution and an average size of about 1,300 nm. Silica nanoparticles prepared with a total sonication time of 30 minutes exhibited a narrower size distribution relative to the silica nanoparticles prepared with a total sonication time of 15 minutes, and an average size of about 500 nm. Silica nanoparticles prepared with a total sonication time of 90 minutes exhibited a narrower size distribution relative to the silica nanoparticles with a total sonication time of 15 minutes, but a broader size distribution relative to the silica nanoparticles prepared with a total sonication time of 30 minutes, and an average size of about 500 nm. The increased sonication time of 90 minutes resulted in increased agglomeration of the silica nanoparticles. As such, following extensive experimentation, the silica nanoparticles sonicated for 60 minutes according to the EXAMPLE were found to have the smallest average size at about 35 nm and the narrowest size distribution.

Sixth, the sonication power has a significant effect on the size of the silica nanoparticles. Silica nanoparticles sonicated at 50 watts have an average particle size of about 500 nm, whereas the silica nanoparticles sonicated at 60 watts in the EXAMPLE above have an average particle size of about 35 nm. As expected, the lower the ultrasonic radiation, the larger the average particle size of the silica nanoparticles. However, surprisingly, the silica nanoparticles sonicated at 70 watts have an average particle size of about 550 nm and the silica nanoparticles sonicated at 75 watts have an average particle size of about 1,250 nm. Therefore, surprisingly, it was found that sonication power above 60 watts increases the average size of the silica nanoparticles. This phenomenon is likely due to the decrease in the collapse rate of the bubbles created by the sonication that results from the larger bubbles created by the higher sonication energy, which enables increased agglomeration of the silica nanoparticles.

It is to be understood that the disclosed implementations are not limited to the particular processes, devices, and/or apparatus described which may, of course, vary. It is also to be understood that the terminology used herein is for the purpose of describing particular embodiments only, and is not intended to be limiting. As used in this application, the singular forms "a," "an," and "the" include plural referents unless the content clearly indicates otherwise.

Reference in the specification to "one implementation" or "an implementation" means that a particular feature, structure, characteristic, or function described in connection with the implementation is included in at least one implementation herein. The appearances of the phrase "in some implementations" in the specification do not necessarily all refer to the same implementation.

Accordingly, other embodiments and/or implementations are within the scope of this application.

What is claimed is:

1. A method for preparing silica-dysprosium oxide core-shell nanoparticles, comprising:
   mixing ethyl silicate, n-butanol, ethylenediamine, and distilled water in the presence of ultrasonic radiation to prepare silica nanoparticles;
   isolating the silica nanoparticles;
   mixing the isolated silica nanoparticles, an acid, n-butanol, and dysprosium oxide in the presence of ultrasonic radiation to prepare silica-dysprosium oxide core-shell nanoparticles; and
   isolating the silica-dysprosium oxide core-shell nanoparticles.

2. The method of claim 1, wherein the ratio of the volume of the n-butanol to the volume of the distilled water mixed to prepare the silica nanoparticles is 5:1.

3. The method of claim 1, wherein the ratio of the volume of the ethyl silicate to the volume of the distilled water mixed to prepare the silica nanoparticles is 1:10.

4. The method of claim 1, wherein the ethylenediamine has a concentration of 0.15 mol/L.

5. The method of claim 4, wherein the ratio of the volume of the ethylenediamine to the volume of the ethyl silicate mixed to prepare the silica nanoparticles is 10:1.

6. The method of claim 1, wherein mixing the ethyl silicate, the n-butanol, the ethylenediamine, and the distilled water in the presence of the ultrasonic radiation to prepare the silica nanoparticles comprises mixing the ethyl silicate, the n-butanol, the ethylenediamine, and the distilled water in the presence of the ultrasonic radiation to prepare the silica nanoparticles at 50° C.

7. The method of claim 1, wherein the ultrasonic radiation has a sonication power of 60 watts.

8. The method of claim 1, wherein mixing the ethyl silicate, the n-butanol, the ethylenediamine, and the distilled water in the presence of the ultrasonic radiation to prepare the silica nanoparticles comprises mixing the ethyl silicate, the n-butanol, the ethylenediamine, and the distilled water in the presence of the ultrasonic radiation for a total of 60 minutes to prepare the silica nanoparticles.

9. The method of claim 1, wherein isolating the silica nanoparticles comprises drying the silica nanoparticles at 80° C.

10. The method of claim 9, wherein isolating the silica nanoparticles comprises calcining the silica nanoparticles at 500° C.

11. The method of claim 1, wherein the acid is citric acid.

12. The method of claim 1, wherein the ratio of the weight of the silica nanoparticles in grams to the volume of solution including the acid, the n-butanol, and the dysprosium oxide mixed to prepare the silica-dysprosium oxide core-shell nanoparticles is 3:500.

13. The method of claim 1, wherein isolating the silica-dysprosium oxide core-shell nanoparticles comprises calcining the silica-dysprosium oxide core-shell nanoparticles at 500° C.

* * * * *